United States Patent
Abeele et al.

(10) Patent No.: US 7,978,071 B2
(45) Date of Patent: Jul. 12, 2011

(54) DEVICE AND METHOD FOR DETECTING THE PRESENCE OF AN OBJECT

(75) Inventors: Didier Van Den Abeele, Asnieres sur Oise (FR); Marc Heddebaut, Sainghin en Melantois (FR); Fouzia Boukour, Aulnoy-lez-Valenciennes (FR); Jean Rioult, Lille (FR)

(73) Assignees: Alstom Transport SA, Levallois-Perret (FR); Inrets-Institut National de Recherche sur les Ti, Arcueil (FR)

( * ) Notice: Subject to any disclaimer, the term of this patent is extended or adjusted under 35 U.S.C. 154(b) by 108 days.

(21) Appl. No.: 11/973,965

(22) Filed: Oct. 11, 2007

(65) Prior Publication Data
US 2008/0117043 A1  May 22, 2008

(30) Foreign Application Priority Data
Oct. 13, 2006  (FR) ..................... 06 54256

(51) Int. Cl.
G08B 13/18 (2006.01)
G08B 13/26 (2006.01)
G08B 26/00 (2006.01)
B61L 23/04 (2006.01)
G01S 13/08 (2006.01)
G01S 13/00 (2006.01)

(52) U.S. Cl. ........ 340/552; 340/540; 340/561; 340/518; 246/120; 246/121; 342/134; 342/21

(58) Field of Classification Search ................ 340/552, 340/540
See application file for complete search history.

(56) References Cited

U.S. PATENT DOCUMENTS

| 3,560,970 | A |   | 2/1971 | Kamimura et al. |
| 4,032,916 | A | * | 6/1977 | Galvin et al. ................. 340/508 |
| 4,091,367 | A | * | 5/1978 | Harman ........................ 340/552 |
| 4,401,980 | A | * | 8/1983 | Rittenbach et al. ........... 340/666 |
| 4,437,138 | A | * | 3/1984 | Nicol ......................... 361/283.2 |
| 5,787,369 | A | * | 7/1998 | Knaak ............................ 701/19 |
| 6,271,754 | B1 | * | 8/2001 | Durtler ........................ 340/552 |
| 7,576,648 | B2 | * | 8/2009 | Harman ........................ 340/552 |
| 2005/0248482 | A1 | * | 11/2005 | Goodman et al. ............ 342/180 |

FOREIGN PATENT DOCUMENTS

| DE | 200 20 009 U1 | 3/2001 |
| WO | WO 96/39640 | 12/1996 |
| WO | WO 99/04286 | 1/1999 |

* cited by examiner

Primary Examiner — George A Bugg
Assistant Examiner — Jack Wang
(74) Attorney, Agent, or Firm — Davidson, Davidson & Kappel, LLC

(57) ABSTRACT

A device for detecting the presence of an object in a detection zone is provided. The device includes a transmission line, a generator which is connected to an input of the transmission line and which is able to generate an input signal, and a receiver which is connected to an output of the transmission line and which is able to measure an output signal, the transmission line being able to radiate a radiated signal in the detection zone when the generator generates the input signal, the detection device further including analysis means which are able to detect the presence of an object in the detection zone in accordance with the output signal.

8 Claims, 2 Drawing Sheets

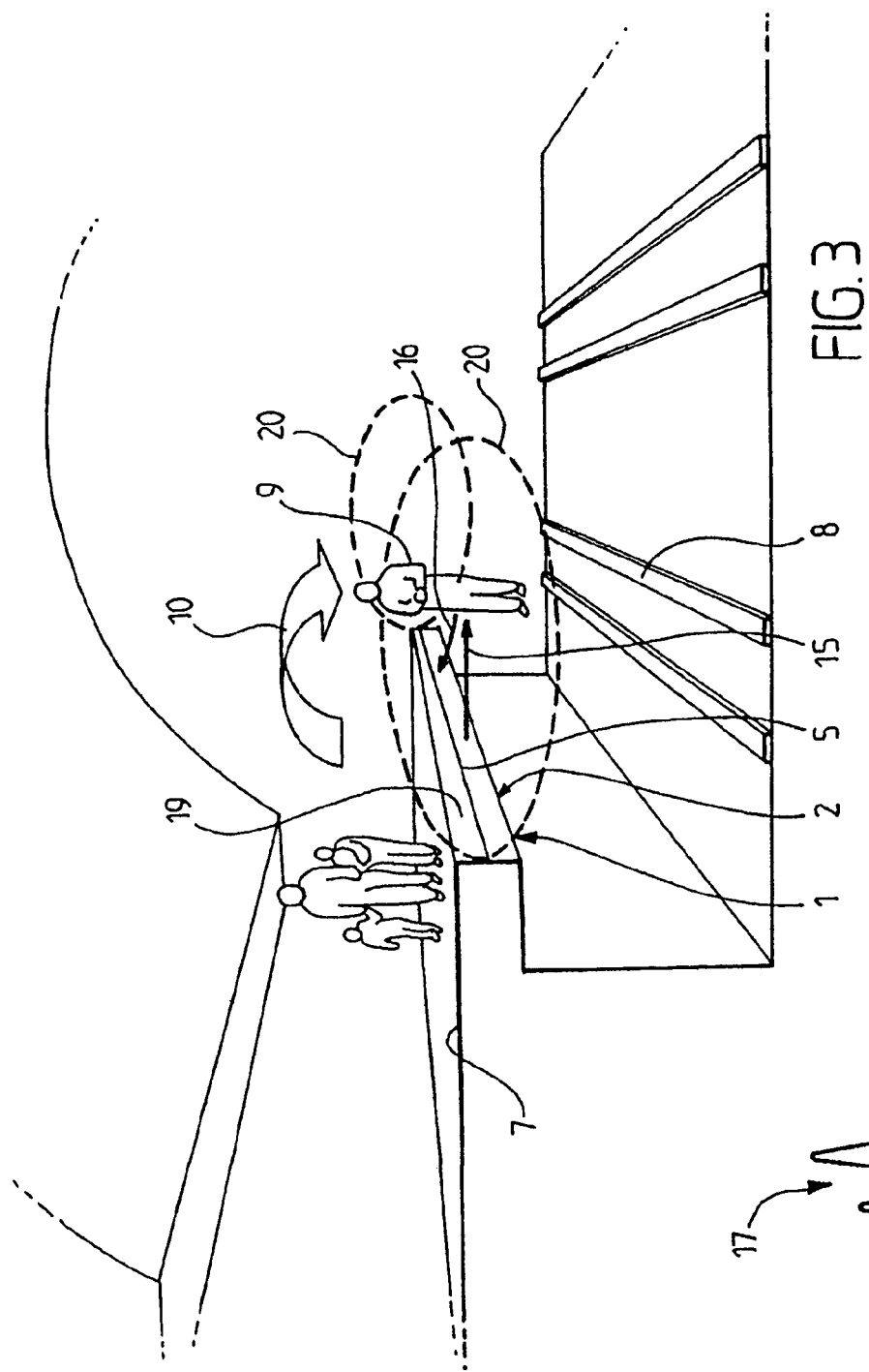
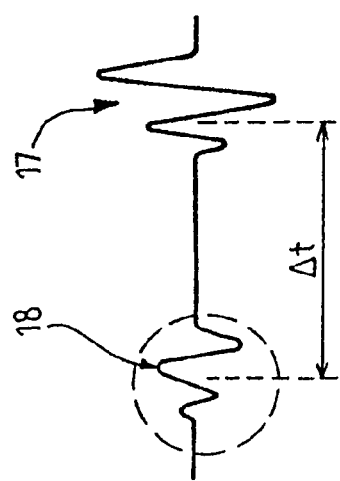
FIG.3
FIG.4

DEVICE AND METHOD FOR DETECTING THE PRESENCE OF AN OBJECT

This claims the benefit of French Patent Application No. 06 54256, filed on Oct. 13, 2006 and hereby incorporated by reference herein.

The present invention relates to a device for detecting the presence of an object in a monitored zone, and in particular the use of such a device in order to detect an object falling onto a transport track.

BACKGROUND TO THE INVENTION

In order to detect an object falling onto a transport track, for example, in an underground railway station, it is known to use a video camera which is positioned above the tracks. However, this solution is not completely satisfactory because it requires extensive and expensive installation and maintenance operations and does not function correctly if the viewing angle of the camera is obscured.

Another known solution is to provide a plurality of electroluminescent diodes along the transport track, for example, one diode every 25 cm. The diodes emit beam rays, and it is possible to detect an interruption of the beam rays. That solution requires a large number of diodes and detectors which also involves extensive and expensive installation and maintenance operations.

SUMMARY OF THE INVENTION

An object of the invention is to provide a device for detecting the presence of an object in a detection zone, which does not have at least some of the above-mentioned disadvantages of the prior art.

To that end, the invention provides a device for detecting the presence of an object in a detection zone, wherein the device comprises a transmission line, a generator which is connected to an input of the transmission line and which is able to generate an input signal, and a receiver which is connected to an output of the transmission line and which is able to measure an output signal, the transmission line being able to radiate a radiated signal in the detection zone when the generator generates the input signal in such a manner that, if an object is present in the detection zone, the output signal comprises a first component owing to the propagation of the input signal along the transmission line and a second component owing to a phenomenon involving interaction between the radiated signal and the object, the detection device further comprising analysis means which are able to confirm the presence or absence of the second component in the output signal in order to detect the presence of an object in the detection zone. The detection of the object is preferably carried out in order to identify the object.

The detection line may include a robust element which requires very little maintenance and which is easy to install.

Preferably, the analysis means are able to compare the output signal with a predetermined reference signal in order to detect the presence of an object.

Advantageously, the reference signal may correspond to an output signal which has been measured in the absence of any object in the detection zone and which is referred to as a calibration signal.

In this manner, a simple operation for differentiating between the output signal and the reference signal may allows confirmation of the presence of the second component owing to the phenomenon involving interaction between the radiated signal and an object.

According to a specific embodiment, the analysis means may comprise identification means which are able to detect characteristics of an object which is present in the detection zone and to compare those characteristics with reference characteristics in order to identify the object.

Preferably, the input signal may comprise an ultra-wide frequency band pulse.

Such an input signal may have a number of advantages. The first component of the output signal, owing to the propagation of the pulse along the transmission line, and the second component of the output signal, owing to an interaction phenomenon (for example, reflection) between the pulse and the object, may be offset in terms of time, even in the case of a short distance between the transmission line and the object. That allows them readily to be distinguished. The first component may therefore serve as a starting point for a measuring time window which defines the range of the detection device. Furthermore, the radiated signal may occupy a large bandwidth and, since the mean power emitted is limited, the spectral density is extremely weak. Thus, other neighboring systems may be prevented from being disrupted, or the system may be prevented from being disrupted by narrow band systems. Furthermore, that bandwidth having a high frequency may provide the overall response of the object to be detected within that entire frequency band, subsequently facilitating the object's identification.

According to a specific embodiment, the transmission line may comprise at least one conductor and a reference plane. For example, the transmission line may comprise a layer of dielectric material, a metal layer which covers a side of the layer of dielectric material and a metal strip at the opposite side of the layer of dielectric material. For example, this may be a micro-tape line, strip-line or coplanar line.

Advantageously, the layer of dielectric material, the metal layer and the metal strip may form a flexible strip.

A flexible strip of this type may be particularly easy to install. For example, the flexible strip can be stored in the form of a roll, then unrolled and fixed along the detection zone.

The invention also may provide for use of a detection device according to the invention above, in order to detect an object falling onto a transport track.

The invention also provides for a method for detecting the presence of an object in a detection zone, wherein the method comprises the steps involving:

generating an input signal at an input of a transmission line, measuring an output signal at an output of the transmission line, the transmission line being able to radiate a radiated signal in the detection zone in such a manner that, if an object is present in the detection zone, the output signal comprises a first component owing to the propagation of the input signal along the transmission line and a second component owing to a phenomenon involving interaction between the radiated signal and the object, confirming the presence or absence of the second component in the output signal in order to detect the presence of an object in the detection zone.

Preferably, the method comprises the fact of analysing the output signal in order to detect characteristics of an object that is present in the detection zone, and comparing those characteristics with reference characteristics in order to identify the object.

BRIEF DESCRIPTION OF THE DRAWINGS

The invention will be better understood, and other objects, details, features and advantages thereof will be appreciated more clearly, in the course of the following description of a specific embodiment of the invention, given purely by way of non-limiting example with reference to the appended drawings, in which:

FIG. 3 is a perspective view of an underground railway station in which the device of FIG. 1 is installed and FIG. 4 is a time chart illustrating an example of an output signal of the device of FIG. 1.

DESCRIPTION OF PREFERRED EMBODIMENTS

Figure 1:
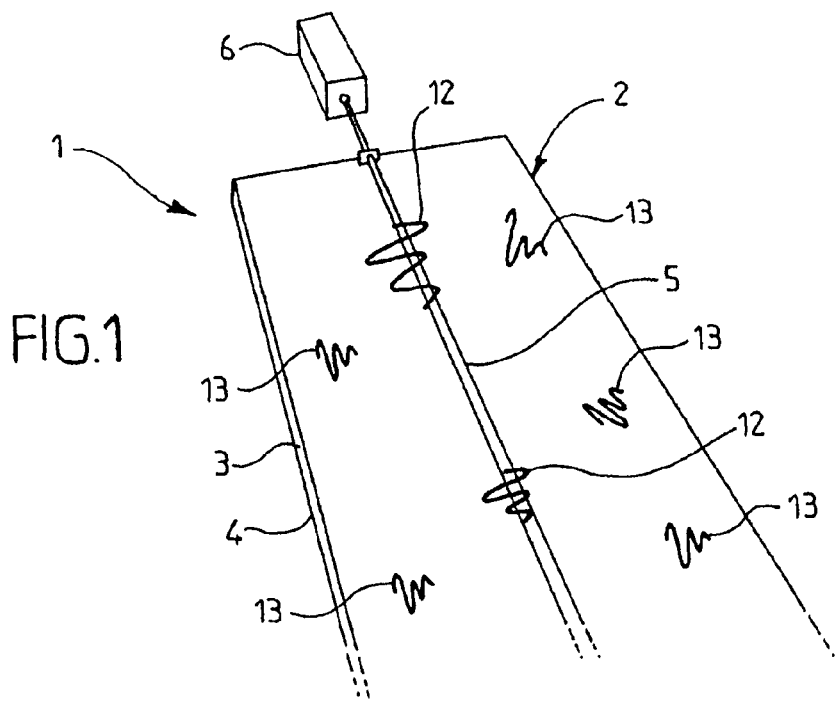
FIG. 1 is a perspective view of a detection device according to an embodiment of the invention.
Figure 2:
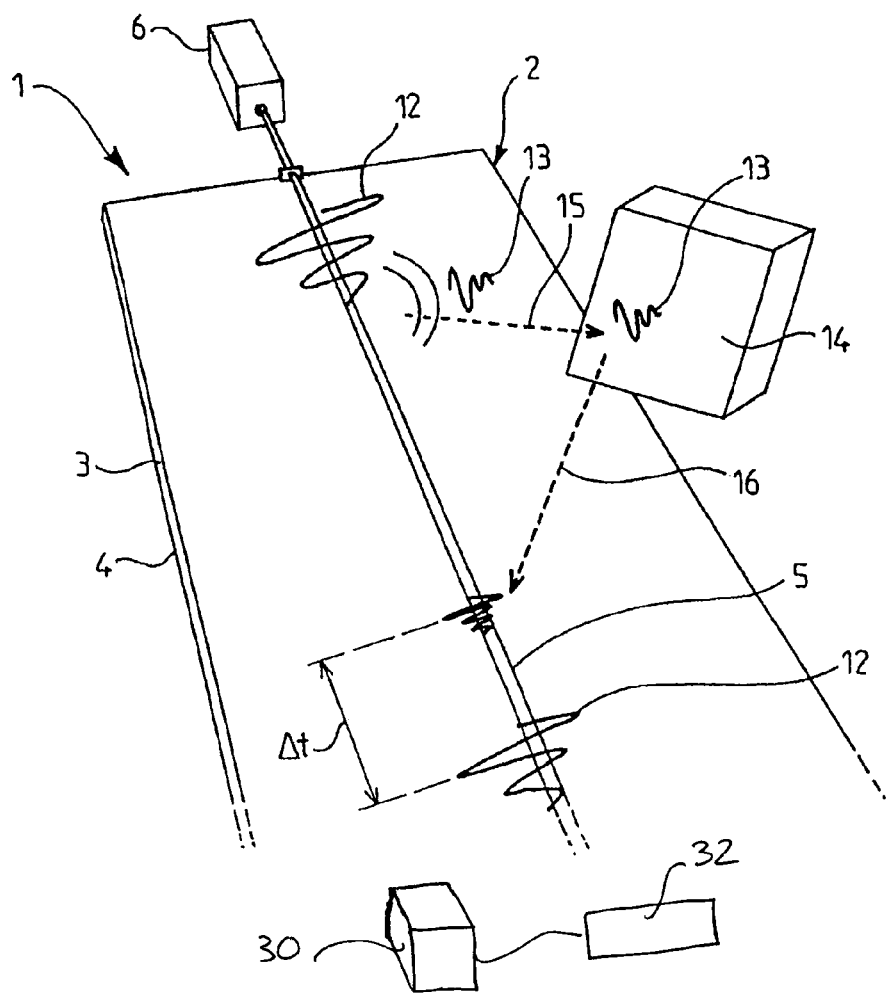
FIG. 2 is a view similar to FIG. 1, in which an object to be detected is illustrated.

With reference to FIGS. 1 and 2, the detection device 1 includes a transmission line 2. In the example illustrated, the transmission line 2 includes a layer 3 of dielectric material of substantially rectangular shape, a metal layer 4 which covers one face of the layer 3 of dielectric material and a metal strip 5 which extends over the opposite face of the layer 3 of dielectric material, in a manner substantially parallel with and at the centre of the two long edges of the layer 3 of dielectric material. Those elements together form a flexible strip.

A generator 6 is connected to an input end of the transmission line 2 and is able to generate an input signal at the input end of the transmission line 2. A receiver 30 is connected to an output end of the transmission line 2 and is able to measure an output signal at the output end of the transmission line 2.

The detection device 1 serves to detect the presence of an object 14 in a detection zone adjacent to the transmission line 2. For that purpose, the detection device 1 also includes analysis means 32 which are connected to the receiver 30 and which are able to analyse the output signal in order to detect the presence of an object. The analysis means 32 include, for example, a microprocessor or a device including an FPGA, on which a suitable program is executed. The microprocessor can be adjacent to the receiver 30, for example, the microprocessor may be arranged in the same housing. Alternatively, the microprocessor can be located remote from the receiver 30, which transmits to the receiver 30 the output signal which is measured by a telecommunications network.

FIG. 3 illustrates the detection device 1 which is provided in an underground railway station. The transmission line 2 is arranged at the edge 19 of the platform 7, over the entire length thereof. The detection device 1 allows the presence of an object, for example, a person 9, to be detected in a detection zone which is indicated by the curves 20. If a person falls from the platform 7 onto a transport track 8, as the arrow 10 indicates, it will thus be possible to take the appropriate steps in order to prevent or limit the risks of an accident.

The operation of the detection device 1 is as follows. In a periodic manner, the generator 6 generates an input signal in the form of an ultra-wide frequency band pulse, that is to say, a pulse having a duration in the order of 1ns or less.

That pulse is propagated along the transmission line 2, as the propagated pulses 12 in FIGS. 1 and 2 illustrate. Furthermore, during that propagation action, two phenomena take place. Firstly, energy is dissipated by the Joule effect. Owing to the dissipated energy, the propagated pulses 12 are attenuated, for example, in the order of 1 dB/10 m at 3 GHz. Secondly, energy is radiated, that is to say, emitted in the form of an electromagnetic wave along the line, as the radiated pulses 13 illustrate.

If an object 14, for example, a person 9, is present in the detection zone, the radiated energy is reflected by the object 14, in particular towards the transmission line 2, as the arrows 15 and 16 in FIGS. 2 and 3 illustrate.

In that case, the output signal includes two components, as FIG. 4 shows. A first component 17 is because of the propagation of the pulse on the transmission line 2, that is to say, directly from the input end to the output end. A second component 18 exists because of a phenomenon involving interference of the radiated pulse on the object 14, which is offset in terms of time by a value $\Delta t$, owing to the propagation time in accordance with the arrows 15 and 16. The interference phenomenon in question can be reflection on the conductive or dielectric walls of the object. Diffraction, in particular at the sharp edges of the object, can also bring about a significant contribution, depending on the type of object. At the highest frequencies, in the millimetric range, a third phenomenon referred to as diffusion of the electromagnetic wave on the object can also often appear. The contribution of those various physical phenomena is a complex relationship involving the frequency, the conductive and dielectric characteristics of the object to be detected. In a centimetric frequency band, that is to say, from 3 to 10 GHz, the phenomena which mainly contribute to the second component 18 are reflection and diffraction. Even for a short distance between the object 14 and the transmission line 2, the offset value $\Delta t$ will generally be greater than a few ns, for example, in the order of 8 ns for a distance of 1.2 m. The pulse generated by the generator 6 is an ultra-wide band pulse which is deformed only slightly during the propagation along the transmission line 2 which has a large pass-band. Thus, the first component 17 of the output signal is also an ultra-wide band pulse having a duration in the order of 1 ns or less. The two components of the output signal may therefore readily be distinguished.

That allows the size of the detection zone to be limited by causing the offset value $\Delta t$ to be less than a given threshold. For example, in the case of a transmission line 2 which is provided along a platform 7, as illustrated in FIG. 3, it is possible to limit the size of the detection zone in order to detect objects falling onto the transport track 8 adjacent to the platform 7, and not onto the second track adjacent to the opposite platform, for which another detection device can be provided. Alternatively or in a complementary manner, the generators of two detection devices which are provided on two opposing platforms can generate pulses having different shapes in order to prevent one of the devices from disrupting the operation of the other, and vice versa.

By establishing the difference between the measured output signal and a predetermined reference signal, which is an output signal measured in the absence of any object in the detection zone, there is obtained a signal corresponding substantially to the second component 18 of the output signal. In a particularly simple embodiment, it is considered that an object is present in the detection zone if that signal has an amplitude greater than a given threshold.

In another preferred embodiment, processing is carried out in order to identify characteristics of the object 14 which is present in the detection zone. For example, the Prony method described in IEEE AP, Vol. 40, Issue 1, *High resolution radar target modeling using a modified Prony estimator*, is used in order to break down the second component 18 into n damped sinusoid curves and to establish n poles characteristic of the object 14. By comparing the n characteristic poles established with pieces of information contained in a library of known targets, it is possible to identify and classify the object 14. That allows, in particular in the event of an object falling onto a transport track 8, appropriate measures to be taken depending on the object 14.

Given that the generator 6 generates an input signal in the form of an ultra-wide frequency band pulse, the energy which is emitted in the form of an electromagnetic wave by the transmission line and which is illustrated by the radiated pulses 13 has a very high spectral content. Consequently, the object 14 generally complies with all of those frequencies/loads, in accordance with the phenomena of reflection and diffraction that are characteristic of the object's geometry and structure. Consequently, it provides in return something which it is possible to refer to as a "global response" that is characteristic of that object in that entire frequency range. Owing to the richness of the information collected, that global response, which a narrow band radar would not provide, subsequently allows the object detected to be identified more readily.

Although the invention has been described with reference to a specific embodiment, it is quite evident that the invention is in no way limited thereto and that the invention includes all the technical equivalents of the means described and combinations thereof if they fall within the scope of the invention.

What is claimed is:

1. A device for detecting a presence of an object in a detection zone in order to detect an object falling onto a transport track comprising:
    a transmission line having an input and an output;
    a generator connected to the transmission line input, the generator being able to generate an input signal, the input signal including an ultra-wide frequency band pulse;
    a receiver connected to the transmission line output, the receiver being able to measure an output signal, the output signal having a first component and a second component when an object is present in the detection zone; and
    an analyzer able to confirm the presence or absence of the second component in the output signal to detect the presence of an object in the detection zone, the analyzer including an identification device able to break down the second component into n damped sinusoid curves and to establish n poles characteristic of the object and comparing the n characteristic poles established with pieces of information contained in a library of known targets in order to identify the object,
    the transmission line being able to radiate a radiated signal in the detection zone when the generator generates the input signal,
    the first component owing to the propagation of the input signal along the transmission line and the second component owing to interaction between the radiated signal and the object when the object is present in the detection zone,
    the analyzer being able to compare the output signal with a predetermined reference signal in order to detect the presence of an object,
    the reference signal corresponding to an output signal measured in an absence of any object in the detection zone,
    the transmission line being able to be provided at an edge of a transport track platform over an entire length of the platform.

2. The device as recited in claim 1 wherein the transmission line includes a layer of dielectric material, a metal layer covering a side of the layer of dielectric material and a metal strip at an opposite side of the layer of dielectric material.

3. The device as recited in claim 2 wherein the layer of dielectric material, the metal layer and the metal strip form a flexible strip.

4. A method for detection comprising:
    detecting an object falling onto a transport track via the device as recited in claim 1.

5. A platform of an underground railway station comprising:
    an edge facing a transport track; and
    the detection device as recited in claim 1, the transmission line being provided over the entire length along the platform edge.

6. A method for detecting a presence of an object in a detection zone, in order to detect an object falling onto a transport track, comprising the steps of:
    generating an input signal at an input of a transmission line, the transmission line being able to be provided along an edge of a transport track platform over an entire length thereof, and the input signal including an ultra-wide frequency band pulse,
    measuring an output signal at an output of the transmission line, the transmission line being able to radiate a radiated signal in the detection zone in such a manner that, if an object is present in the detection zone, the output signal includes a first component owing to the propagation of the input signal along the transmission line and a second component owing to interaction between the radiated signal and the object,
    confirming the presence or absence of the second component in the output signal in order to detect the presence of an object in the detection zone;
    comparing the output signal with a predetermined reference signal in order to detect the presence of an object, the reference signal corresponding to an output signal measured in an absence of any object in the detection zone;
    breaking down the second component into n damped sinusoid curves;
    establishing n poles characteristic of the object; and
    comparing the n characteristic poles established with pieces of information contained in a library of known targets in order to identify the object.

7. The method as recited in claim 6 wherein the transport track is an underground railway station track.

8. A device for detecting a presence of an object in a detection zone in order to detect an object falling onto a transport track comprising:
    a transmission line having an input and an output;
    a generator connected to the transmission line input, the generator being able to generate an input signal, the input signal including an ultra-wide frequency band pulse;
    a receiver connected to the transmission line output, the receiver being able to measure an output signal, the output signal having a first component and a second component when an object is present in the detection zone; and
    an analysis means able to confirm the presence or absence of the second component in the output signal to detect the presence of an object in the detection zone, the analysis means including an identification device able to break down the second component into n damped sinusoid curves and to establish n poles characteristic of the object and comparing the n characteristic poles established with pieces of information contained in a library of known targets in order to identify the object,
    the transmission line being able to radiate a radiated signal in the detection zone when the generator generates the input signal, the first component owing to the propagation of the input signal along the transmission line and the second component owing to interaction between the radiated signal and the object when the object is present in the detection zone, the analysis means being able to compare the output signal with a predetermined reference signal in order to detect the presence of an object, the reference signal corresponding to an output signal measured in an absence of any object in the detection zone, the transmission line being able to be provided at an edge of a transport track platform over an entire length of the platform.

* * * * *